Feb. 14, 1950     C. H. KEAN     2,497,172
MEANS FOR MOUNTING ELONGATED MAGNETOSTRICTIVE ELEMENTS
Filed Sept. 27, 1947
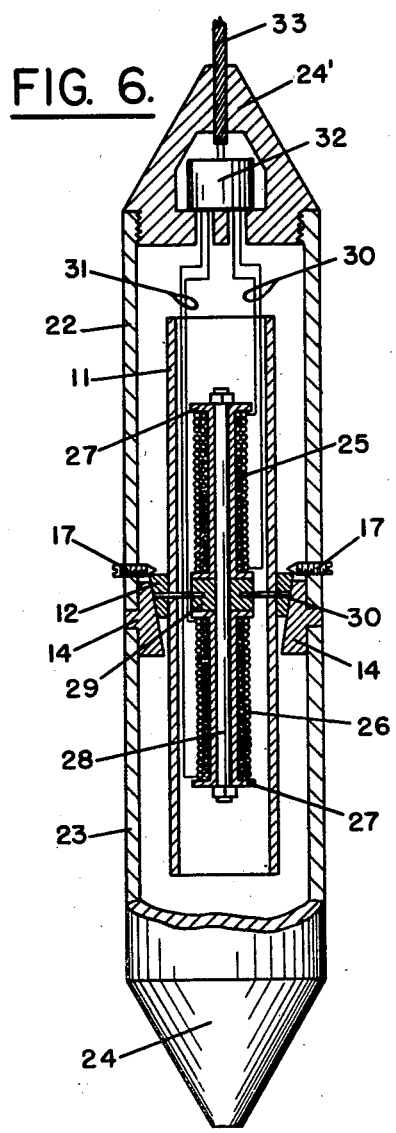
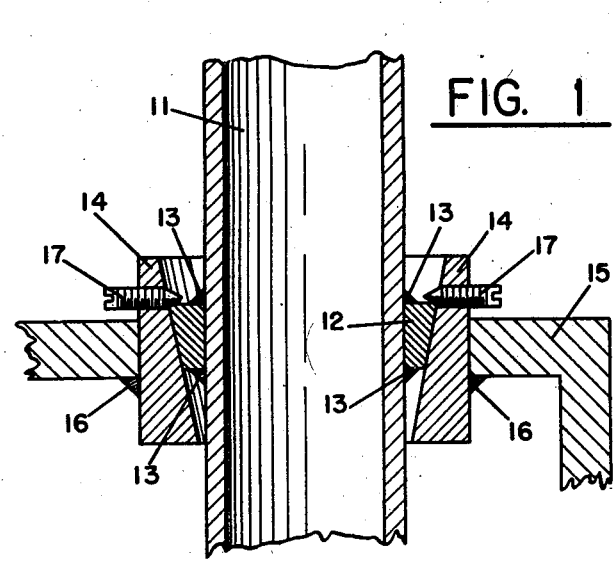
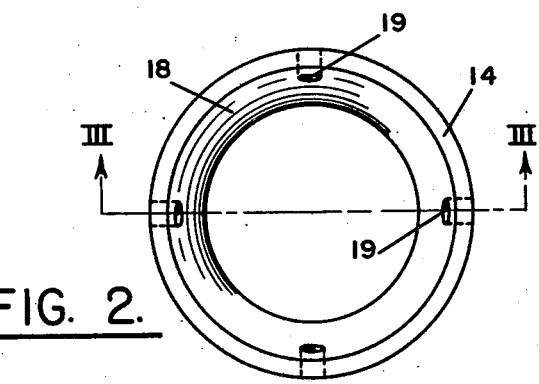
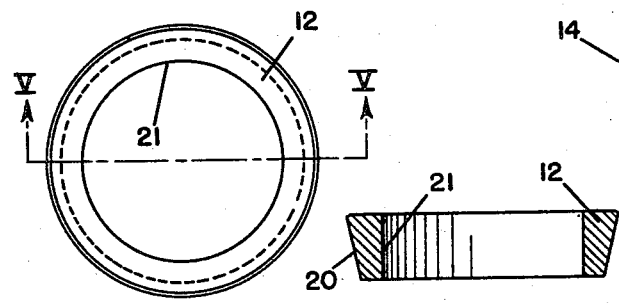
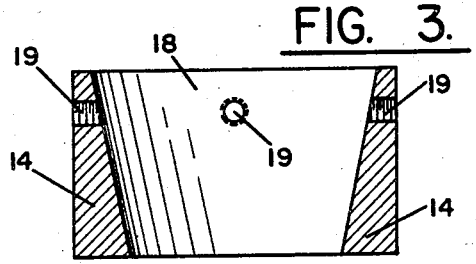
Clare H. Kean, INVENTOR.
BY Dwight C. Otis
AGENT.

Patented Feb. 14, 1950

2,497,172

UNITED STATES PATENT OFFICE 2,497,172

MEANS FOR MOUNTING ELONGATED MAGNETOSTRICTIVE ELEMENTS

Clare H. Kean, Houston, Tex., assignor, by mesne assignments, to Standard Oil Development Company, Elizabeth, N. J., a corporation of Delaware Application September 27, 1947, Serial No. 776,549

3 Claims. (Cl. 171—209)

The present invention is directed to a mounting means for magnetostrictive devices. More particularly, the invention is directed to a mounting means for elongated magnetostrictive elements adapted to well logging devices.

It is known to generate constant frequency sound waves by exciting a bar or tube of magnetostrictive metal by passing an alternating current through a solenoid electro-mechanically coupled to the bar or tube. It is also known to control the frequency of alternating current by means of one or more solenoids electro-mechanically coupled to a bar or tube of magnetostrictive metal and electrically connected to an electron tube or other suitable oscillator network. In each of these methods it is conventional to suspend an elongated magnetostrictive element, generally in a horizontal position, on a knife edge at a position midway between the ends of the magnetostrictive element.

I have found that an elongated magnetostrictive element such as a bar or tube may be securely mounted in any position so that its ends are free to vibrate by securing to an external, medial portion of the element a wedge member which is concentric with the longitudinal axis of the element, and by providing means for forcing the wedge member into a bevelled seat in a suitable supporting structure.

One object of the present invention is to provide a secure and rigid means for mounting an elongated bar or tube or magnetostrictive material in any position so that its ends are free to vibrate.

Another object of the present invention is to provide a secure and rigid means for mounting an elongated magnetostrictive element so that it may be readily transported from place to place without upsetting the position of the element relative to the supporting structure.

Still another object of the present invention is to provide a secure and compact means for mounting an elongated magnetostrictive element in an apparatus adapted to the acoustic logging of subsurface formations penetrated by a borehole.

Other and further objects of the present invention will appear from the following description when read in conjunction with the accompanying drawing in which Fig. 1 is an elevation, partly in section, of an elongated magnetostrictive element mounted in a supporting plate in accordance with one embodiment of the invention;

Fig. 2 is a plan view of one embodiment of a seat member for the mounting means for my invention;

Fig. 3 is a sectional view along the line III—III of Fig. 2;

Fig. 4 is a plan view of one embodiment of a ring wedge member for the mounting means of my invention;

Fig. 5 is a sectional view along the line V—V of Fig. 4; and

Fig. 6 is an elevation, partly in section, of a magnetostrictive well logging device employing the mounting means of my invention.

Turning first to Fig. 1, the numeral 11 designates an elongated magnetostrictive element which may be a bar or tube of rectilinear or circular cross section. For purposes of description herein, it will be assumed that magnetostrictive element 11 is a tube of magnetostrictive material having a circular cross section.

In a preferred embodiment of my invention, a ring wedge member 12 is secured coaxially around element 11 at a medial position between the ends thereof. Wedge member 12 may be suitably secured to element 11 by welding or by silver soldering at points designated by 13. It will be understood that wedge member 12 may be of any suitable hard metal.

Wedge member 12 is preferably constructed so that its inner surface fits snugly against the outer surface of element 11. The outer surface of wedge member 12 is uniformly tapered so that this outer surface will provide a smooth and uniform contact against a bevelled or conical seat member 14.

Seat member 14 may be a ring-like member having its inner surface bevelled to receive wedge member 12, and seat member 14 may be welded or otherwise securely affixed to a supporting structure 15 such as a plate or bracket by welding seat member 14 to bracket 15 at the points designated by numeral 16. It will be apparent that bracket 15 may be mounted to other support means such as the wall of a building, as desired.

A plurality of conically tipped set screws are arranged on diametrically opposite sides through seat member 14 at a position such that the conical tips of said screws will contact the upper edge of ring wedge 12, thereby forcing wedge 12 to seat firmly in seat member 14.

It will be apparent that although seat member 14 is shown in Fig. 1 as a ring-shaped member mounted in a flat plate, seat member 14 need not necessarily be a separate element welded to the support structure 15. Thus, support structure 15 might be a relatively thick plate having a bevelled opening adapted to receive ring wedge 12 provided suitable means are employed to force ring wedge 13 securely into its seat and hold the element and ring wedge in this position. Similarly, ring wedge 12 need not necessarily be a relatively thin ring-like member as illustrated in the drawing but may be a ring-like member having an appreciably larger outside periphery than the periphery of the magnetostrictive element.

It will be apparent that the ring wedge and bevelled seat construction illustrated in Fig. 1 is compact and particularly suitable for mounting an elongated magnetostrictive element in a confined space such as a tubular well logging device to be described in conjunction with Fig. 6.

Referring to Fig. 2, numeral 14 designates generally a plan view of the bevelled seat member shown in Fig. 1. Seat member 14 is provided with a bevelled face 18 and a plurality of threaded holes 19 arranged on diametrically opposite sides of the member and adapted to receive the conically tipped screws 17 referred to in Fig. 1.

The seat member of Fig. 2 is shown in sectional elevation in Fig. 3 wherein similar numerals identify similar parts.

Referring now to Figs. 4 and 5, the numeral 12 identifies a plan view of one embodiment of ring wedge 12 described in conjunction with Fig. 1. As will be seen from the drawing, ring wedge 12 is provided with a conically tapered outer surface 20 which is adapted to seat against the face 18 of seat member 14. Wedge member 12 is also provided with an inner face 21 which is adapted to fit snugly against the outer periphery of the magnetostrictive element referred to by the numeral 11 in Fig. 1.

It will be understood that the angle of taper of the face 20 with respect to the inner face 21 of wedge member 12 is not critical so long as the inner surface 18 of seat member 14 is bevelled at a similar angle. In the practice of my invention, I have found that an angle of taper of 7° between faces 20 and 21 is satisfactory although other angles may be used.

Turning now to Fig. 6, my improved means for securely mounting an elongated magnetostrictive element within a tubular well logging device is illustrated. In the embodiment illustrated in Fig. 6, a ring wedge member 12 is secured to the medial portion of an elongated magnetostrictive element 11, as by silver soldering thereto, and bevelled seat member 14 is secured to a pair of tubular outer shell members 22 and 23 as by welding, brazing or silver soldering thereto. Outer shell members 22 and 23 may be provided with end members 24 and 24' which may be threadedly engaged in the outer ends thereof. A pair of coils 25 and 26 arranged upon spool-like members 27 are clamped by means of a bolt 28 onto each plane face of a plate 29 whose plane is perpendicular to the longitudinal axis of element 11. As will be seen in the drawing, the plate 29 is preferably secured midway between the ends of element 11 by a plurality of diametrically opposite pins 30 driven through ring wedge 12, element 11 and thence into plate 29.

As in the embodiment of Fig. 1, ring wedge 12 is caused to seat firmly in seat member 14 by means of a plurality of conically tapered screws 17 which may pass through tubular shell element 22.

In order to excite magnetostrictive element 11, coils 25 and 26 are preferably connected through pairs of conductors 30 and 31 to suitable means 32, such as an electron tube oscillator, which may conveniently be arranged within end member 24'. Electrical power for means 32 is preferably supplied through a multi-conductor cable 33 connected therewith. Since the means for exciting element 11 is not a part of the present invention, details of means 32 will not be described herein. An apparatus for logging subsurface formations in accordance with the apparatus shown in Fig. 6 and including a suitable electron tube oscillator is disclosed and specifically claimed in my copending application Ser. No. 763,940, filed July 26, 1947.

Although I have described wedge member 12 as a ring wedge and have illustrated this member in the form of a circular band about element 11, it is to be understood that the outer perimeter of member 12 may be rectilinear, rather than circular, so long as it conforms to the opening in seat member 14. Similarly, although I have illustrated one mode of forcing wedge member 12 into seat member 14 by means of conically tipped screws 17 passed through seat member 14, other equivalent means for holding wedge member 12 seated in member 14 will readily occur to workers skilled in the art.

Having fully described and illustrated the present invention, what I desire to claim is:

1. An improved mounting for a magnetostrictive element adapted to permit free vibration of the ends thereof which comprises an elongated element of magnetostrictive material, a wedge member rigidly affixed coaxially around the outer periphery and substantially midway between the ends of said element, a rigid supporting member defining an opening having a bevelled seat adapted to receive said wedge member, and means for forcing said wedge member to seat in said opening.

2. A means for mounting a magnetostrictive element within a borehole logging device and adapted to permit free vibration of the ends of said element which comprises an elongated cylindrical element of magnetostrictive material, a ring wedge rigidly affixed coaxially around the outer circumference and substantially midway between the ends of said element, a tubular body arranged coaxially around said element and said ring wedge, a seat member, defining a circular opening adapted to receive said ring wedge, rigidly affixed coaxially within said tubular body, and a plurality of screws arranged in diametrically opposite walls of said tubular body to force said ring wedge into said bevelled seat.

3. An improved mounting for a magnetostrictive element adapted to permit free vibration of the ends thereof which comprises an elongated element of magnetostrictive material, a wedge member rigidly affixed coaxially around the outer periphery and substantially midway between the ends of said element, a rigid supporting member comprising a tube arranged coaxially around said elongated element and having rigidly affixed therein a seat member defining an opening adapted to receive said wedge member, and means for forcing said wedge member into said seat member.

CLARE H. KEAN.

REFERENCES CITED

The following references are of record in the file of this patent:

UNITED STATES PATENTS

| Number | Name | Date |
|---|---|---|
| 1,650,131 | Johnstone | Nov. 22, 1927 |
| 1,680,900 | McQuaid | Aug. 14, 1928 |
| 2,207,469 | Roye | July 9, 1940 |